United States Patent
Cowburn

(10) Patent No.: US 9,953,037 B1
(45) Date of Patent: Apr. 24, 2018

(54) ACCELERATING FILE DOWNLOADS

(71) Applicant: Amazon Technologies, Inc., Reno, NV (US)

(72) Inventor: Piers George Cowburn, London (GB)

(73) Assignee: Amazon Technologies, Inc., Seattle, WA (US)

( * ) Notice: Subject to any disclaimer, the term of this patent is extended or adjusted under 35 U.S.C. 154(b) by 916 days.

(21) Appl. No.: 13/790,294

(22) Filed: Mar. 8, 2013

(51) Int. Cl.
*G06F 17/30* (2006.01)

(52) U.S. Cl.
CPC .............................. *G06F 17/30194* (2013.01)

(58) Field of Classification Search
CPC .............................................. G06F 17/30194
See application file for complete search history.

(56) References Cited

U.S. PATENT DOCUMENTS

| 2006/0059246 A1* | 3/2006 | Grove | 709/219 |
| 2007/0083574 A1* | 4/2007 | Garin et al. | 707/204 |
| 2012/0226738 A1* | 9/2012 | Taneja et al. | 709/203 |

\* cited by examiner

*Primary Examiner* — Kris E Mackes
(74) *Attorney, Agent, or Firm* — Thomas | Horstemeyer, LLP

(57) ABSTRACT

Disclosed are various embodiments for accelerating the download of files via a browser. The browser is configured to determine a file to be downloaded from a server. The browser determines a quantity of concurrent connections for the browser. The browser requests a plurality of fragments of the file from the server based at least in part on the quantity of concurrent connections. The browser reconstitutes the file by combining the fragments received from the server.

24 Claims, 4 Drawing Sheets

ACCELERATING FILE DOWNLOADS

BACKGROUND

Network applications, such as web applications, may involve considerable amounts of code that has to be downloaded. Network applications are typically developed having numerous small files, with each file corresponding to a class or another functional groupings. Each of these files may be requested independently using separate application-level connections, but this may result in delays due to connection overhead. Also, execution of the network application may depend on having a particular file. A delay in downloading that particular file, e.g., due to an interrupted connection, causes the execution of the network application also to be delayed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to accelerating the downloading of files via a network. Such acceleration as will be described may particularly benefit network applications where a relatively large amount of data is downloaded for the network application to begin execution. Network applications are typically produced having numerous small files, with each file corresponding to a particular class or functional grouping. Downloading each file using an independent application-level network connection may result in considerable connection overhead. One optimization may be to concatenate all of the files together into one large file, thereby reducing the number of application-level network connections to one. However, browsers often do not maximize the available bandwidth for a single application-level network connection. For example, a client may have a 10 Megabit per second network connection, but a single application-level network connection through a browser may reach only 2 Megabits per second.

Various embodiments of the present disclosure accelerate the downloading of a file through a browser by splitting the file into multiple fragments according to a quantity of concurrent connections for the browser to maximize available bandwidth. The fragments may be pre-generated or generated on demand in response to a request. By using multiple concurrent connections, the browser is able to maximize the use of available bandwidth. Nonetheless, the number of concurrent connections is selected to avoid delays due to connection overhead, typically resulting in fewer connections than if each individual file making up a larger file were independently requested. In the following discussion, a general description of the system and its components is provided, followed by a discussion of the operation of the same.

Figure 1:
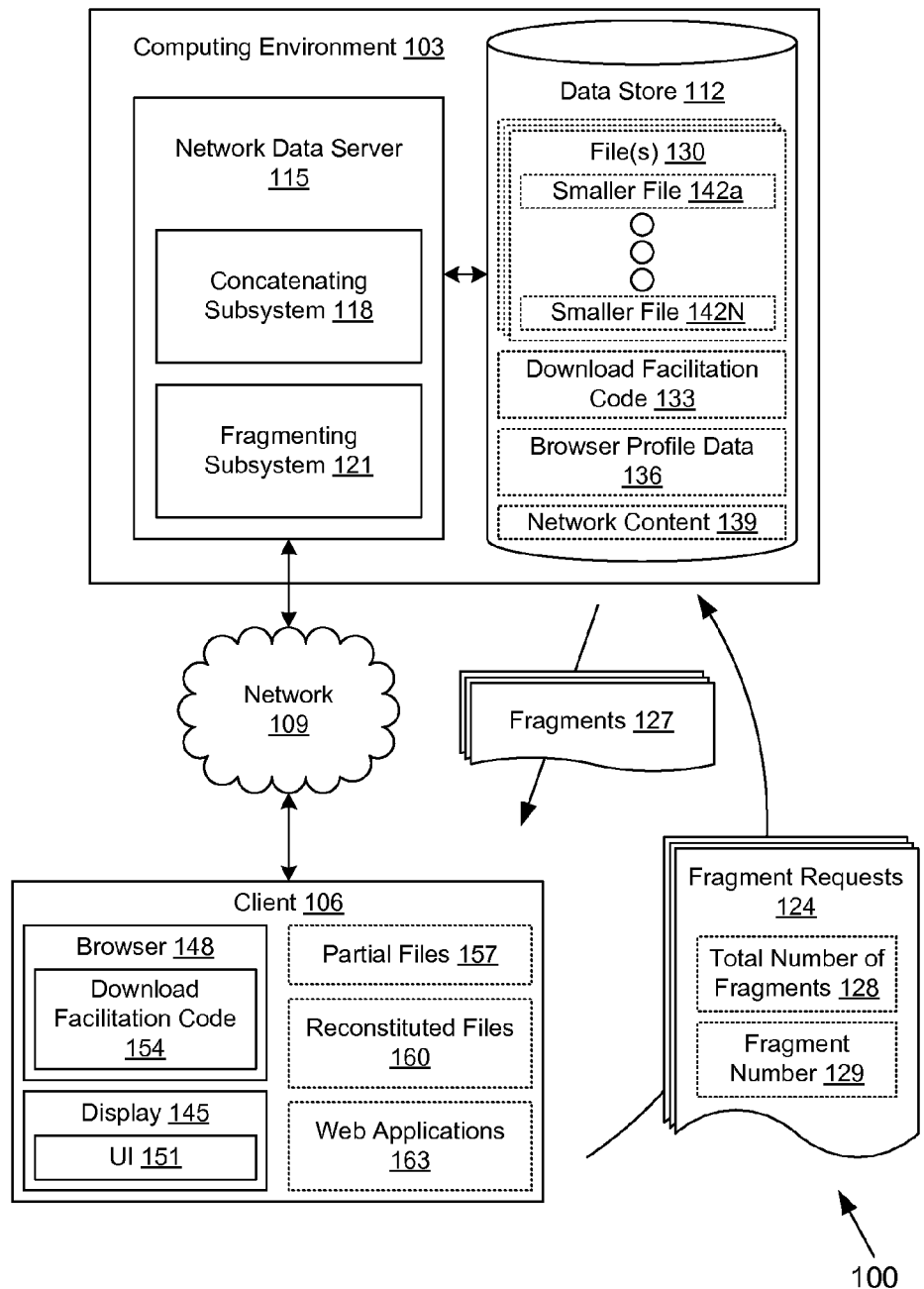
FIG. 1 is a drawing of a networked environment according to various embodiments of the present disclosure.

With reference to FIG. 1, shown is a networked environment 100 according to various embodiments. The networked environment 100 includes a computing environment 103 and one or more clients 106 in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a network data server 115 and other applications, services, processes, systems, engines, or functionality not discussed in detail herein. The network data server 115 is executed to serve up network content via the network 109 in response to requests from clients 106. The network data server 115 may comprise a commercially available hypertext transfer protocol (HTTP) server such as Apache® HTTP Server, Apache® Tomcat®, Microsoft® Internet Information Services (IIS), or other servers. In particular, the network data server 115 may include a concatenating subsystem 118 and a fragmenting subsystem 121. The concatenating subsystem 118 is configured to concatenate collections of files into a single larger file. The fragmenting subsystem 121 is configured to obtain fragment requests 124 and produce fragments 127 in response to the fragment requests 124. In one embodiment, a fragment request 124 specifies a total number of fragments 128 and a fragment number 129.

The data stored in the data store 112 includes, for example, one or more files 130, download facilitation code 133, browser profile data 136, network content 139, and potentially other data. The files 130 correspond to data that may be fragmented by the fragmenting subsystem 121. The files 130 may correspond to concatenations of a plurality of smaller files 142a . . . 142N, which may be pre-generated or generated by the concatenating subsystem 118. In one non-limiting example, a file 130 corresponds to a web application, and the smaller files 142 respectively correspond to the various objects or classes that comprise the functional units of the web application. Such objects or classes may correspond to multiple programming languages. It is noted that a particular file 130 may be composed of a multitude of such smaller files 142. Also, the smaller files 142 may be of differing sizes. Further, it is noted that a file 130 may include code as well as data other than code, e.g., image data, audio data, video data, and other data.

The download facilitation code 133 corresponds to code for execution by clients 106 to facilitating downloading of files 130 via a plurality of fragments 127. In some cases, the download facilitation code 133 may be preinstalled in the client 106. Alternatively, the download facilitation code 133 may be obtained from the network data server 115 by the clients 106. In one embodiment, different versions of the download facilitation code 133 may be provided for different clients 106.

The browser profile data 136 includes browser-specific configuration parameters for the download facilitation code 133. For example, the browser profile data 136 may pre-define quantities of concurrent connections for different browser versions to maximize available bandwidth. The network content 139 may correspond to various other data that may be served up by the network data server 115, data that may be served up without fragmentation. Such network content 139 may include web pages, mobile application data, images, audio, video, and/or other data.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 145. The display 145 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a browser 148 and/or other applications. The browser 148 may be executed in a client 106, for example, to access network content 139 served up by the computing environment 103 and/or other servers, thereby rendering a user interface 151 on the display 145. The browser 148 may, for example, correspond to a browser, a mobile application, etc., and the user interface 151 may correspond to a network page, a mobile application screen, etc. Specifically, the browser 148 may execute download facilitation code 154 in order to facilitate downloads of files 130 via multiple fragments 127. The download facilitation code 154 may store one or more fragments 127 as partial files 157 in the client 106. The download facilitation code 154 may generate reconstituted files 160 from the fragments 127.

In some cases, web applications 163 may be installed and/or executed based at least in part on reconstituted files 160. As a non-limiting example, portions of web applications 163 may be written in different programming languages and executed in different virtual machines or interpreters. Alternatively, an entire web application 163 may be written in a single programming language and executed in a single virtual machine or interpreter. The client 106 may be configured to execute applications beyond the browser 148 such as, for example, mobile applications, email applications, social networking applications, and/or other applications.

Next, a general description of the operation of the various components of the networked environment 100 is provided. To begin, download facilitation code 154 is obtained at the client 106 and executed in a browser 148. The browser 148 determines a file 130 to be downloaded. In one example, the file 130 corresponds to a web application 163. The download facilitation code 154 concurrently opens a plurality of independent application-level connections via the network 109 to the network data server 115 that serves up the file 130. Such connections may correspond, for example, to HTTP connections.

The quantity of the connections is selected to maximize the use of the available bandwidth. A fragment request 124 is sent over each of the connections for a respective fragment 127. The respective fragment 127 is obtained via the connection. The download facilitation code 154 reconstitutes the file 130 when all of the fragments 127 have been received. It is noted that a single file 130 may be split into fragments 127 of different sizes for different clients 106 and/or different browsers 148.

Figure 2:
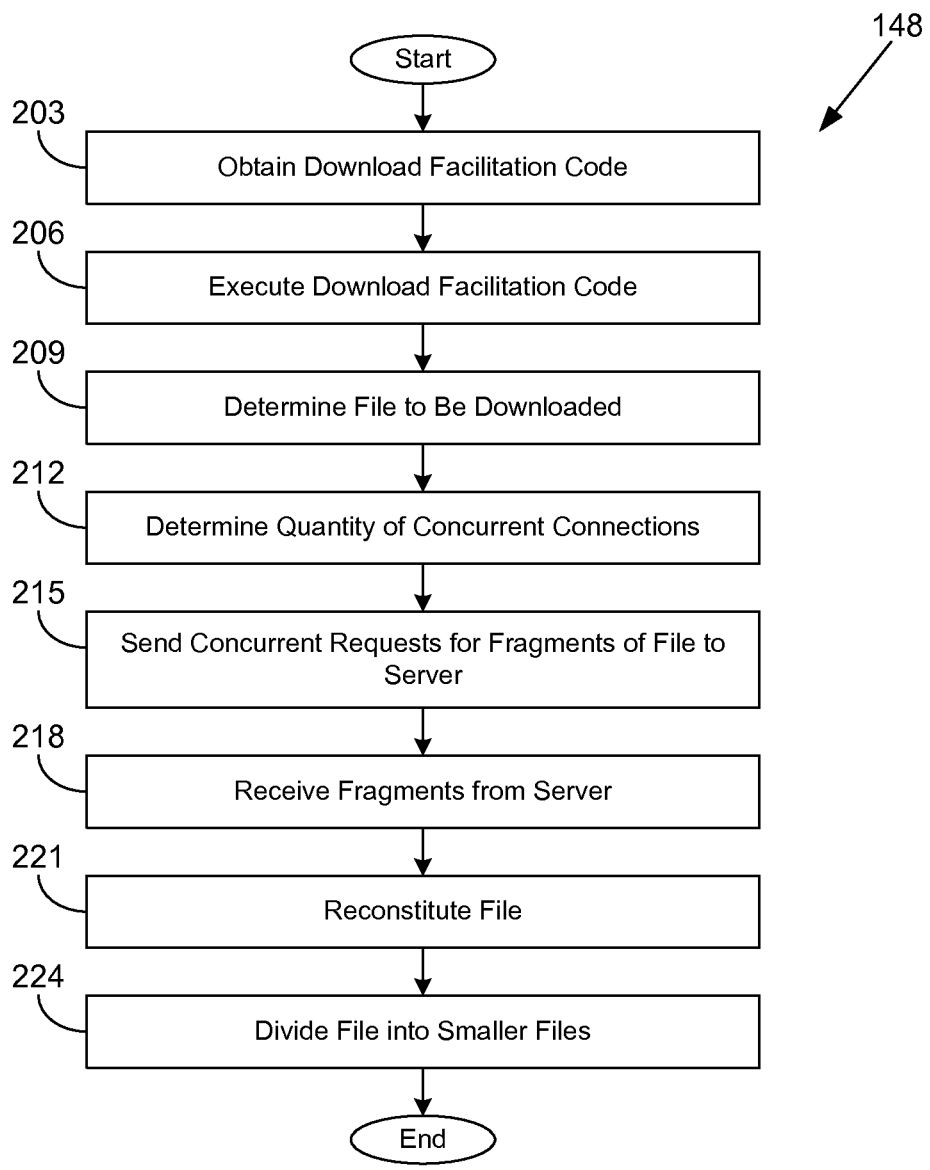
FIG. 2 is a flowchart illustrating one example of functionality implemented as portions of a browser executed in a client in the networked environment of FIG. 1 according to various embodiments of the present disclosure.

Referring next to FIG. 2, shown is a flowchart that provides one example of the operation of a portion of the browser 148 according to various embodiments. It is understood that the flowchart of FIG. 2 provides merely an example of the many different types of functional arrangements that may be employed to implement the operation of the portion of the browser 148 as described herein. As an alternative, the flowchart of FIG. 2 may be viewed as depicting an example method implemented in the client 106 (FIG. 1) according to one or more embodiments.

Beginning with box 203, the browser 148 obtains download facilitation code 133 (FIG. 1) from the network data server 115 (FIG. 1) via the network 109 (FIG. 1). Alternatively, the download facilitation code 133 may be pre-installed or otherwise pre-existing in the client 106. In box 206, the browser 148 executes the download facilitation code 133. The download facilitation code 133 may configure the browser 148 to perform the subsequent tasks shown in FIG. 2. In box 209, the browser 148 determines a file 130 (FIG. 1) to be downloaded. For example, the download facilitation code 133 may be preconfigured to download a particular file 130 at a given uniform resource locator (URL).

In box 212, the browser 148 determines a quantity of concurrent connections for the browser 148 to maximize available bandwidth. Such a quantity may differ among browsers 148. The quantity may be predetermined, being available in the client 106 or obtainable from the browser profile data 136 (FIG. 1) stored in the data store 112 (FIG. 1). For example, the quantity may be available via an application programming interface (API) call within the browser 148.

Alternatively, the browser 148 may be configured to determine empirically the quantity of concurrent connections. To this end, the browser 148 may be configured to perform a probe operation using test connections to determine a quantity of concurrent connections that maximizes available bandwidth. In one embodiment, the browser 148 may initially select a predetermined value for the quantity of concurrent connections when downloading a particular file 130 and then adaptively update this value for subsequent files 130 based upon the results. For example, the browser 148 may increase the quantity value until maximum bandwidth is achieved. Conversely, the browser 148 may decrease the quantity value until bandwidth begins being reduced.

In box 215, the browser 148 sends N concurrent fragment requests 124 (FIG. 1) for N fragments 127 (FIG. 1) to the network data server 115 via the network 109. The value of N is determined based at least in part on the determined quantity of concurrent connections. In one embodiment, N is selected to be equal to this determined quantity. In another embodiment, N is selected to be greater than the determined quantity. Such an embodiment may employ persistent connections to reduce connection overhead.

Each of the fragment requests 124 may include a respective fragment number 127 (FIG. 1) (e.g., one of 0 . . . N) and a total number of fragments 128 (FIG. 1) (e.g., N). In one embodiment, a respective fragment request 124 may be sent to a specially constructed URL, e.g., "http://domainname/?name=NAME&totalFrags=TOTALFRAGS&num=FRAGNUM," where "NAME" is a filename for the requested file 130, "TOTALFRAGS" is the total number of fragments 128, and "FRAGNUM" is the respective fragment number 127. Other approaches for fragment addressing, e.g., fragment byte offset and fragment byte length, may be used in other embodiments.

In various embodiments, all of the fragments 127 may be requested from the same network data server 115 having the same domain name. However, in some situations, a browser 148 may have a limit on connections to a particular domain name that is less than the quantity of concurrent connections to maximize available bandwidth. In such a situation, the browser 148 may be configured to request fragments 127 for a particular file 130 through different domain names, which may map to the same network data server 115 or network site serviced by a common pool of network data servers 115. As a non-limiting example, it may be determined that ten connections are optimal to maximize bandwidth, but there may be a browser-imposed limit of five connections to a particular domain name. In such a situation, the browser 148 may request five fragments 127 through five connections to a primary domain name and request five fragments 127 through five connections to a secondary domain name. Both primary and secondary domain names may map to the same network data server 115 or common pool of network data servers 115 for a network site.

In box 218, the browser 148 receives the fragments 127 from the network data server 115 via the network 109. It is understood that the fragments 127 may arrive in any order. The fragments 127 may be the same size or different sizes. Some fragments 127 may be delayed relative to the other fragments 127. The received fragments 127 are stored by the browser 148 as partial files 157 (FIG. 1). In box 221, once all fragments 127 for a file 130 are received, the browser 148 reconstitutes the file 130, thereby generating a reconstituted file 160 (FIG. 1).

In box 224, the browser 148 may divide the reconstituted file 160 into the smaller files 142 (FIG. 1) from which it was composed. For example, where the reconstituted file 160 corresponds to a web application 163 (FIG. 1), it may be desired to obtain the smaller files 142 in order to execute the web application 163. It is noted that the smaller files 142 may be different from the fragments 127, and a smaller file 142 may span multiple fragments 127. In other words, a file 130 may be split into fragments 127 irrespective to boundaries of the smaller files 142. As a non-limiting example, a smaller file 142 may contain the code: "console.log('hello world')." A first fragment 127 may include "console.log ('hel," and a second fragment 127 may include "lo world')."

Where such a file 130 corresponds to a web application 163, the browser 148 may wait for all of the fragments 127 to download before beginning execution of the web application 163. In some embodiments, the file 130 may be split into fragments 127 considering boundaries of the smaller files 142. Further, the browser 148 may begin execution of partial files 157 where fragments 127 containing initially loaded smaller files 142 are already downloaded. Execution of the partial file 157 may stop in anticipation of fragments 127 that have not yet been received. Thereafter, the portion of the browser 148 ends.

Figure 3:
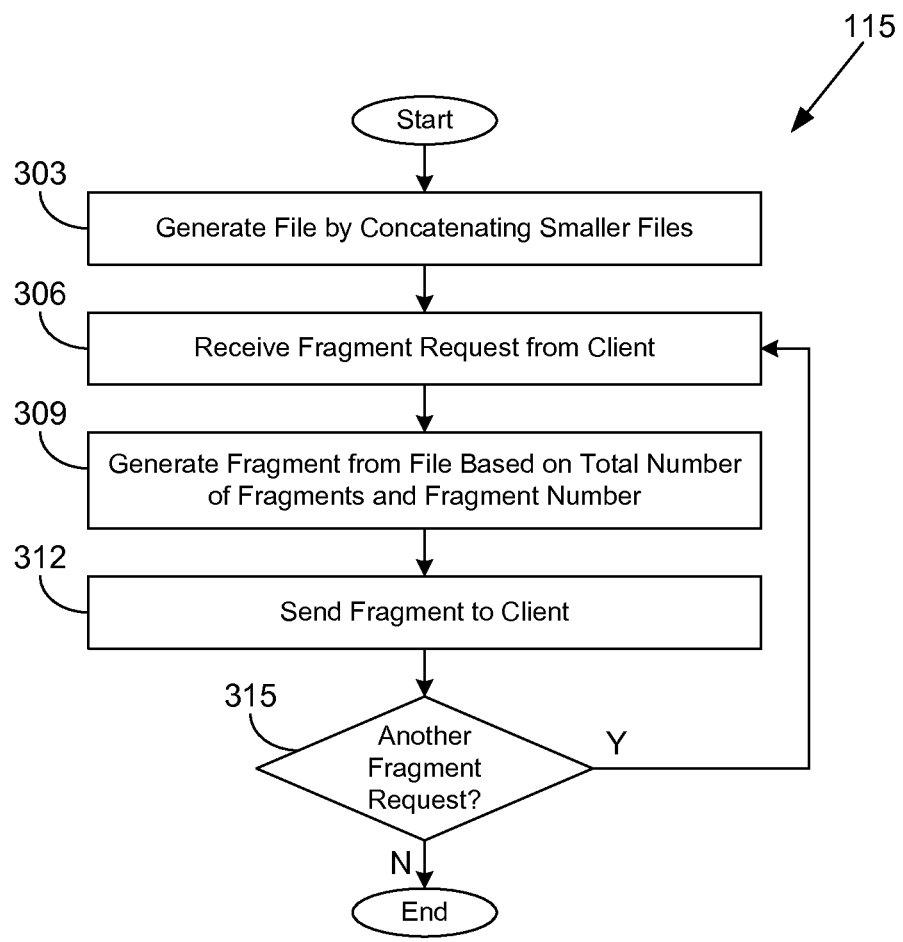
FIG. 3 is a flowchart illustrating one example of functionality implemented as portions of a network data server executed in a computing environment in the networked environment of FIG. 1 according to various embodiments of the present disclosure.

Turning now to FIG. 3, shown is a flowchart that provides one example of the operation of a portion of the network data server 115 according to various embodiments. It is understood that the flowchart of FIG. 3 provides merely an example of the many different types of functional arrangements that may be employed to implement the operation of the portion of the network data server 115 as described herein. As an alternative, the flowchart of FIG. 3 may be viewed as depicting an example method implemented in the computing environment 103 (FIG. 1) according to one or more embodiments.

Beginning with box 303, the network data server 115 may generate a file 130 (FIG. 1) through the concatenating subsystem 118 (FIG. 1) concatenating multiple smaller files 142 (FIG. 1). In other embodiments, the file 130 may be unitary (i.e., not composed of smaller files 142) or otherwise may be pre-existing in the data store 112 (FIG. 1). In box 306, the network data server 115 receives a fragment request 124 (FIG. 1) from a client 106 (FIG. 1) via the network 109 (FIG. 1).

In box 309, the network data server 115 uses the fragmenting subsystem 121 (FIG. 1) to generate a fragment 127 (FIG. 1) from the file 130 based at least in part on the total number of fragments 128 (FIG. 1) and the fragment number 129 (FIG. 1) embodied in the fragment request 124. In other embodiments, byte offsets and fragment lengths may be employed, among other fragment-identification approaches. The fragmenting subsystem 121 may be invoked based upon the URL for the fragment request 124. In other embodiments, the fragments 127 may be pre-generated and pre-existing in the data store 112. In box 312, the network data server 115 sends the fragment 127 to the client 106 via the network 109, in fulfillment of the fragment request 124.

In box 315, the network data server 115 determines whether another fragment request 124 is to be received. If another fragment request 124 is to be received, the network data server 115 returns to box 306. Otherwise, if another fragment request 124 is not to be received, the portion of the network data server 115 ends.

Figure 4:
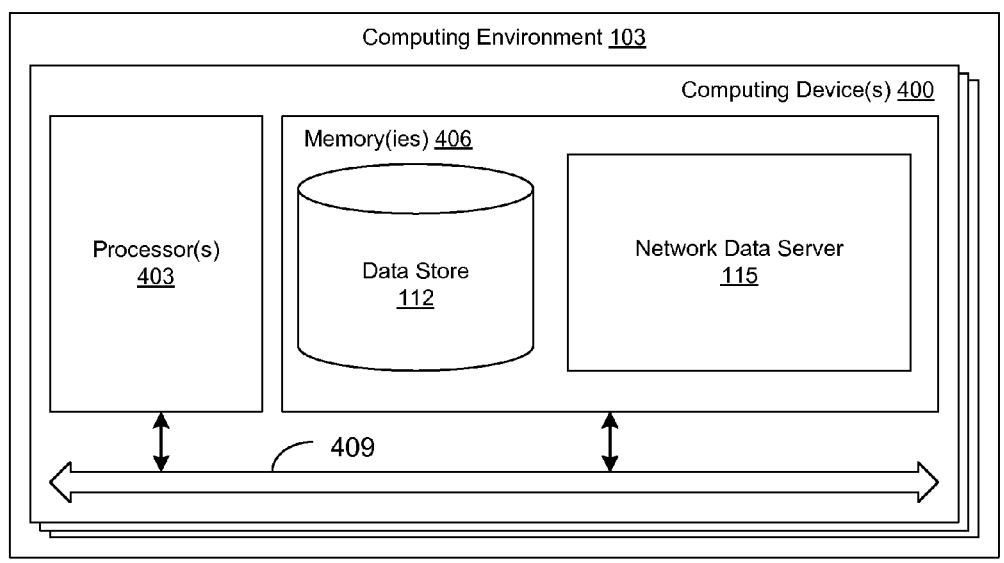
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is the network data server 115 and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network data server 115, the browser 148 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the browser 148 and the network data server 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network data server 115 and the browser 148, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a computing device;
    a browser executable in the computing device; and
    download facilitation code executable in the computing device, wherein when executed by the browser the download facilitation code causes the computing device to at least:
        identify a file to be downloaded from a network site;
        open a plurality of test network connections to the network site according to a quantity of concurrent connections that is predetermined;
        adaptively update the quantity of concurrent connections by adding test network connections to the plurality of test network connections until a maximum bandwidth is achieved or removing individual ones of the test network connections until the maximum bandwidth begins being reduced;
        dynamically determine a total number of fragments of the file corresponding to the quantity of concurrent connections that has been adaptively updated;
        open a plurality of independent connections to the network site corresponding to the quantity of concurrent connections that has been adaptively updated;
        request each of a plurality of fragments of the file using a respective dynamically generated uniform resource locator (URL) through a respective one of the plurality of independent connections, the respective dynamically generated URL specifying a respective fragment number and the total number of fragments; and
        reconstitute the file from the plurality of fragments.

2. The system of claim 1, wherein the plurality of test network connections and the plurality of independent connections are hypertext transfer protocol (HTTP) connections.

3. The system of claim 1, wherein a first subset of the plurality of independent connections are to the network site through a first domain name, and a second subset of the plurality of independent connections are to the network site through a second domain name.

4. The system of claim 3, wherein a quantity of the first subset of the plurality of independent connections or a quantity of the second subset of the plurality of independent connections is determined based at least in part on a connection limit to a single domain name imposed by the browser.

5. The system of claim 1, wherein the download facilitation code is preinstalled in the computing device.

6. The system of claim 1, wherein the browser is configured to obtain the download facilitation code from the network site.

7. The system of claim 1, wherein the file corresponds to a web application.

8. The system of claim 1, wherein when executed the download facilitation code causes the computing device to at least divide the file into a different plurality of fragments after reconstituting the file.

9. A method, comprising:
    identifying, via a browser executed by a computing device, a file to be downloaded from a network site;
    opening, via the browser executed by the computing device, a plurality of test network connections to the network site according to a quantity of concurrent connections that is predetermined;
    adaptively updating, via the browser executed by the computing device, the quantity of concurrent connections by adding test network connections to the plurality of test network connections until a maximum bandwidth is achieved or removing individual ones of the test network connections until the maximum bandwidth begins being reduced;
    dynamically determining, via the browser executed by the computing device, a total number of fragments of the file corresponding to the quantity of concurrent connections that has been adaptively updated;
    opening, via the browser executed by the computing device, a plurality of independent connections to the network site corresponding to the quantity of concurrent connections that has been adaptively updated;
    requesting, via the browser executed by the computing device, each of a plurality of fragments of the file using a respective dynamically generated uniform resource locator (URL) through a respective one of the plurality of independent connections; and
    reconstituting, via the browser executed by the computing device, the file from the plurality of fragments.

10. The method of claim 9, wherein the quantity of concurrent connections that is predetermined is specific to the browser.

11. The method of claim 9, further comprising dynamically generating, via the browser executed by the computing device, the respective dynamically generated URL based at least in part on a respective fragment number and the total number of fragments.

12. The method of claim 9, further comprising dynamically generating, via the browser executed by the computing device, the respective dynamically generated URL based at least in part on a respective fragment byte offset and a respective fragment byte length.

13. The method of claim 9, further comprising reordering, via the browser executed by the computing device, the plurality of fragments before reconstituting the file.

14. The method of claim 9, wherein the plurality of test network connections or the plurality of independent connections are hypertext transfer protocol (HTTP) connections.

15. The method of claim 9, further comprising, after reconstituting the file, dividing, via the browser executed by the computing device, the file into a different plurality of fragments.

16. The method of claim 15, further comprising executing, via the browser executed by the computing device, at least one of the different plurality of fragments.

17. A non-transitory computer-readable medium having a plurality of computer instructions wherein, when executed by at least one computing device, the plurality of computer instructions cause the at least one computing device to at least:
- identify a file to be downloaded from a network site via a browser;
- open, via the browser, a plurality of test network connections to the network site according to a quantity of concurrent connections that is predetermined;
- adaptively update, via the browser, the quantity of concurrent connections by adding test network connections to the plurality of test network connections until a maximum bandwidth is achieved or removing individual ones of the test network connections until the maximum bandwidth begins being reduced;
- request each of a plurality of fragments of the file via the browser using a respective dynamically generated uniform resource locator (URL) through a respective one of a plurality of independent connections corresponding to the quantity of concurrent connections that has been adaptively updated, the respective dynamically generated URL specifying a respective fragment number and a total number of fragments; and
- reconstitute the file via the browser from the plurality of fragments.

18. The non-transitory computer-readable medium of claim 17, wherein the plurality of computer instructions further cause the at least one computing device to at least divide the file into a different plurality of fragments after reconstituting the file.

19. The non-transitory computer-readable medium of claim 17, wherein the respective fragment number and the total number of fragments are specified as distinct parameters in the respective dynamically generated URL.

20. The non-transitory computer-readable medium of claim 17, wherein the quantity of concurrent connections that is predetermined is specific to the browser.

21. The non-transitory computer-readable medium of claim 17, wherein the plurality of test network connections and the plurality of independent connections are application-layer network connections.

22. The non-transitory computer-readable medium of claim 17, wherein the plurality of computer instructions further cause the at least one computing device to at least execute, via the browser, at least a portion of the file.

23. The non-transitory computer-readable medium of claim 17, wherein the plurality of computer instructions further cause the at least one computing device to at least obtain an initial predetermined value for the quantity of concurrent connections via an application programming interface (API) call within the browser.

24. The non-transitory computer-readable medium of claim 17, wherein the plurality of computer instructions further cause the at least one computing device to obtain, via the browser, download facilitation code from the network site, wherein the download facilitation code when executed by the browser causes the browser to perform the opening of the plurality of test network connections, the adaptive updating of the quantity of concurrent connections, the requesting of each of the plurality of fragments, and the reconstituting of the file.

* * * * *